United States Patent [19]

Pollman

[11] Patent Number: 4,478,041
[45] Date of Patent: Oct. 23, 1984

[54] HYDRAULIC MOTOR CONTROL

[75] Inventor: Frederic W. Pollman, Ames, Iowa

[73] Assignee: Sundstrand Corporation, Rockford, Ill.

[21] Appl. No.: 294,640

[22] Filed: Aug. 20, 1981

[51] Int. Cl.³ .............................................. F16H 39/46
[52] U.S. Cl. ...................................... 60/444; 60/450; 60/452
[58] Field of Search ........................ 60/444, 450, 452

[56] References Cited

U.S. PATENT DOCUMENTS

| 2,056,896 | 10/1936 | Douglas | 60/450 |
| 3,186,170 | 6/1965 | Gauthier | 60/452 |
| 3,246,465 | 4/1966 | Bookout et al. | 60/433 |
| 3,285,000 | 11/1966 | Christenson et al. | 60/423 |
| 3,354,978 | 11/1967 | Budzich | 180/44 |
| 3,924,410 | 12/1975 | Cornell | 60/444 |
| 3,986,357 | 10/1976 | Hoffman | 60/431 |
| 4,129,987 | 12/1978 | Blume | 60/452 |

FOREIGN PATENT DOCUMENTS 1535205 12/1978 United Kingdom .

Primary Examiner—Douglas Hart
Attorney, Agent, or Firm—Wood, Dalton, Phillips, Mason & Rowe

[57] ABSTRACT

A control for a variable displacement motor and operable in either direction of rotation of the motor (10) and which acts on a servo cylinder (55) to set the position of a wash plate (50). The control includes a signal-setting valve (65) operable in response to the rate of fluid flow through the motor by sensing a pressure drop in a closed circuit line to the motor to set a variable control signal and the variable control signal is applied to the displacement-setting mechanism (56,55) for the motor to have a decrease in motor displacement related to an increase in the rate of fluid flow through the motor.

17 Claims, 5 Drawing Figures

HYDRAULIC MOTOR CONTROL

DESCRIPTION

1. Technical Field

This invention relates to hydraulic motor controls for variable displacement motors and, more particularly, to such controls which control motor displacement by sensing flow through the motor and which are operable in either direction of rotation of the motor.

2. Background Art

In some vehicles having a high ratio of torque at minimum speed to torque at maximum speed, use of a variable displacement motor tends to reduce the size and cost of the hydraulic units and such motor also extends the speed range of a power transmission, such as a hydrostatic transmission. A control which regulates the displacement of the motor to provide maximum angle at low vehicle speeds and minimum angle at high vehicle speeds is required to meet the particular vehicle requirements set forth above. With an automatic control which changes the motor displacement in response to a parameter sensed within the motor, the motor control can be entirely self-contained and vehicle speed can be set by setting the displacement of the pump supplying fluid to the motor.

One type of prior motor control system uses the pressure of the hydraulic system as the sensed parameter and the motor is normally at minimum displacement and the control increases displacement if the set system pressure is exceeded. The tendency for small angles of the displacement-setting member and small motor displacement leads to high system pressures with accompanying higher losses and lower life of the equipment than would be experienced with larger motor displacements. Additionally, since the angle of the displacement-setting member for the motor changes independently of the pump, there is some loss of vehicle speed control over the range of motor pressure compensation. Also, when the motor acts as a pump in an overrunning mode, the pressure compensation control acts to increase the angle of the displacement-setting member, which will increase flow and pressure in a cascading manner which causes undesirable braking and possible overspeed of the prime mover associated with the pump.

A flow-sensing control for control of a variable displacement motor is shown in Budzich U.S. Pat. No. 3,354,978 wherein the control is designed to operate in an open circuit system. In the Budzich patent, the motor having the flow-sensing control has a motor-reversing valve associated therewith which is operable when the direction of rotation of the motor is to be reversed. General reference is made in the Budzich patent to structure by which the displacement of the motor can be controlled when the motor is operating in a reverse driving range. These modifications appear to relate to modifications of the reversing valve which would have to be shifted in response to manual initiation when the flow reverses.

Disclosure of the Invention

The present invention relates to new and improved control structure for sensing fluid flow through a variable displacement motor and controlling the motor displacement in response to the rate of flow.

The invention also relates to a flow-sensing motor displacement control which is operable automatically in both directions of rotation of the motor.

An object of the invention is to provide hydraulic motor controls with improved and simplified structure for controlling displacement of the motor in response to the rate of flow through the motor.

Another object of the invention is to provide hydraulic motor controls for controlling displacement of a variable displacement motor in a manner related to the rate of flow through the motor and which is automatically operable to control displacement in both directions of rotation of the motor.

Still another object of the invention is to provide a control for a variable displacement motor operable in either direction of rotation and having a movable member for setting motor displacement and positioning means including a servo member connected to said movable member for normally urging said movable member to a first position to set maximum motor displacement and for moving said movable member from said first position in response to a variable control signal comprising, means including a signal-setting valve operable in either direction of fluid flow through the motor and responsive to the rate of fluid flow therethrough for establishing the variable control signal which is generally proportional to said rate of fluid flow and which is applied to said member-positioning means.

Still another object of the invention is to provide a control for a variable displacement motor having a movable member for setting motor displacement comprising, a signal-setting valve having: a valve member movable from a first position to establish a variable control signal; pilot means responsive to a pressure differential representative of the rate of fluid flow through the motor for positioning of the valve member; and inlet connection for delivery of control pressure to the signal-setting valve and an outlet connection therefrom to tank; an outlet connection for delivery of the variable control signal to means for positioning said movable member; a pair of feedback pilots with outlet connections extended one to each of said feedback pilots; and said signal-setting valve and valve member thereof having means operable when positioned away from said first position for modifying the control pressure to set the variable control signal and for directing the variable control signal to one of said feedback pilots.

BEST MODES FOR CARRYING-OUT THE INVENTION

Figure 1:
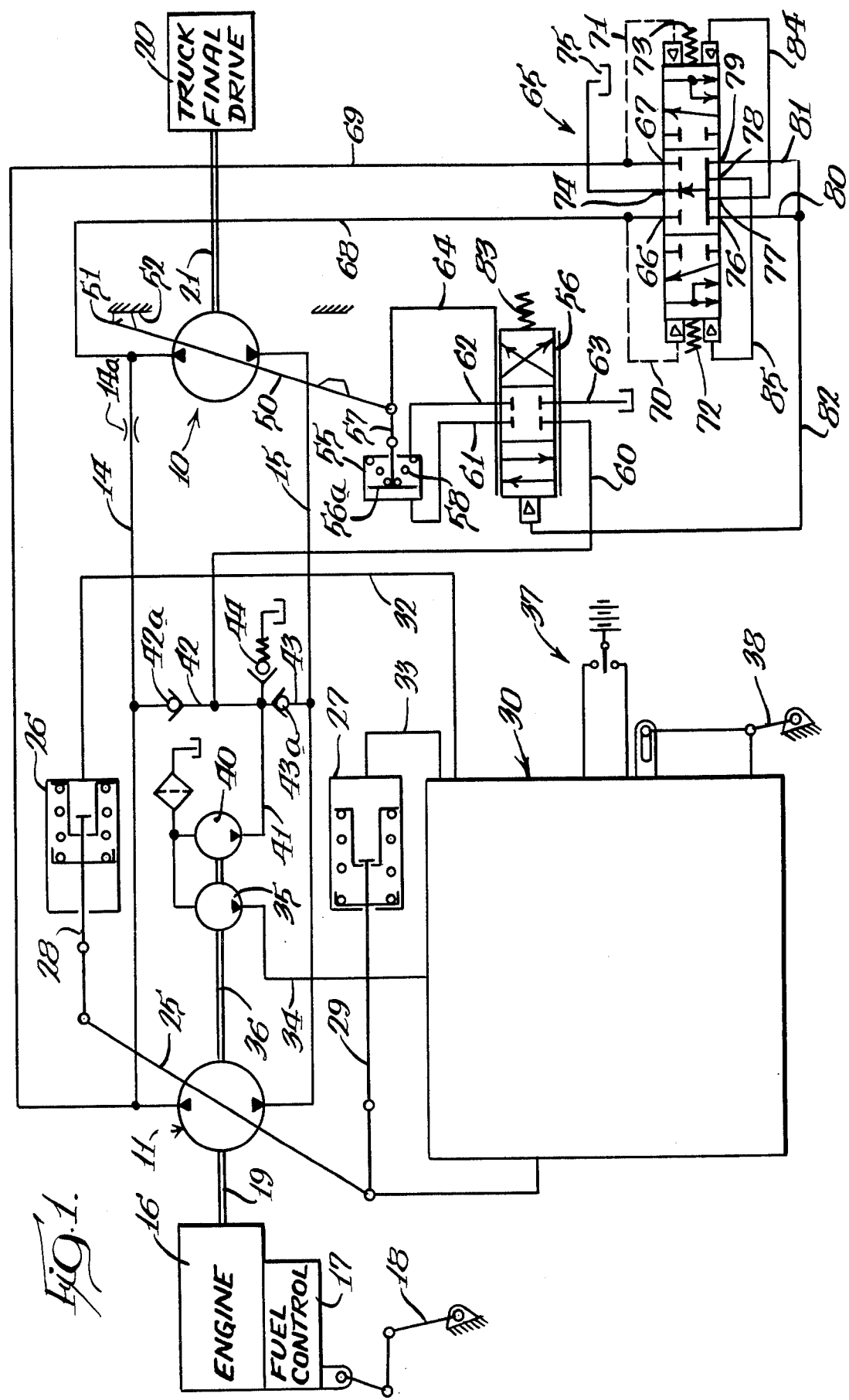
FIG. 1 is a schematic drawing of a hydrostatic transmission having a variable displacement motor shown in association with components of a vehicle and showing a first embodiment of the hydraulic motor control.

In the embodiment of FIG. 1, a variable displacement motor, indicated generally at 10, is in closed hydrostatic transmission circuit with a pump, indicated generally at 11, by means of interconnecting closed system fluid lines 14 and 15. The transmission can be used in a vehicle drive wherein a vehicle engine 16, having its speed set by operation of a fuel control 17 from an operator's pedal 18, drives the pump by means of a shaft 19. A truck final drive 20 is connected to the motor 10 by a shaft 21.

The pump 11 is shown as a variable displacement pump having a displacement-setting member 25 positionable by a servo control including a pair of servo cylinders 26 and 27 having the respective rods 28 and 29 extended therefrom and through pivoted connections to opposite ends of the displacement-setting member 25.

A control for the displacement of the pump is indicated generally at 30 and forms no part of the invention disclosed herein. Generally, the pump displacement control includes valve structure for directing control pressure to one or the other of the control servos 26 and 27 through the respective lines 32 and 33 and receiving a source of fluid under pressure through a line 34 from a charge pump 35 driven by the engine 16 through a shaft extension 36. The direction of fluid flow from the pump can be changed by operation of a suitable F-N-R valve within the control 30 and which can be electrically operated, as by a switch in a circuit indicated generally at 37. Additionally, braking of the vehicle through control of the transmission can also be accomplished through the control 30 and in response to operation of an operator's brake pedal 38.

A second charge pump 40, driven by the engine 16, operates to supply make-up fluid to either of the hydrostatic transmission system lines 14 and 15 which is at the lower pressure by means of an outlet line 41 with branch lines 42 and 43 extending to the respective system lines 14 and 15. Each of the branch lines 42 and 43 has a check valve 42a and 43a which prevent reverse flow. An overpressure relief valve 44 connects the outlet line 41 from the charge pump to tank.

The variable displacement motor 10 can be of the axial piston type having a displacement-setting member in the form of a swash plate 50 which is shown in maximum displacement-setting position with an element 51 on the swash plate against an abutment 52 and with means for positioning the swash plate 50 including a servo cylinder 55 and a displacement control valve 56. The servo cylinder 55 has a piston 56a with its rod pivotally connected to a link 57 which connects to an end of the swash plate 50. A spring 58 within the servo cylinder normally urges the swash plate 50 to the position which sets maximum motor displacement.

The displacement control valve 56 is a four-way valve having an inlet connection to a line 60 which extends from the branch line 42 connected to the charge pump 40 whereby a source of fluid under pressure is directed to the displacement control valve. This valve has a pair of connections to lines 61 and 62 extending to opposite ends of the servo cylinder 55 and a connection to a line 63 extending to tank. The displacement control valve has a normal closed centered position wherein neither of the lines 61 and 62 extending to the servo cylinder communicate with pressure or tank. The valve member of the displacement control valve can shift to modulating positions at either side of the centered position for delivery of fluid under pressure to one side of the servo cylinder and connection of the other side thereof to tank and with a mechanical feedback of swash plate position being directed to the displacement control valve through linkage 64.

The position of the displacement control valve 56 is under the control of a signal-setting valve, indicated generally at 65, which directs a variable control signal to the displacement control valve for positioning of the latter dependent upon flow through the motor 10.

The signal-setting valve 65 is shown diagrammatically by use of conventional symbols in FIG. 1 and has a pair of inlet connections 66 and 67 to a pair of fluid lines 68 and 69, respectively, which connect into the closed circuit system line 14 of the hydrostatic transmission at points sufficiently spaced apart whereby the long flow path therebetween defines a resistance, similar to an orifice, to provide a pressure drop proportional to the rate of flow through the closed circuit line and through the motor 10. For clarity of understanding the invention by examination of FIG. 1, an orifice 14a is shown in line 14 but, as noted above, such orifice is not necessary when the line 14 is relatively long. A pair of pilot lines 70 and 71 extend from each of the lines 68 and 69 to pilots at opposite ends of the valve member of the signal-setting valve whereby the pressure differential represented by the pressure drop through the circuit line 14 results in positioning of the valve member. A pressure differential of sufficient magnitude causes the valve member to move away from the centered position as established by the opposed springs 72 and 73. In the centered position of the signal-setting valve, the inlet connections 66 and 67 are blocked and a line 74 extends to tank 75 and four outlet connections 76–79 are connected thereto. The outlet connections 76 and 79 connect with fluid lines 80 and 81 which merge into a line 82 extended to the displacement control valve. The variable control signal set by the valve 65 acts upon the displacement control valve 56 in opposition to a spring 83 and sets the position of the displacement control valve to control the delivery of fluid from the supply line 60 to the servo cylinder 55.

The outlet connection 77 connects to a line 84 and the outlet connection 78 connects to a line 85, with the lines 84 and 85 extending to pilots at opposite ends of the valve for applying a feedback signal, which has the same value as the variable control signal, to the valve member of the signal-setting valve. More particularly, when there is flow to the motor 10 through the closed circuit line 14, a higher pressure exists in line 69 than in line 68 and, with these different pressures being applied through pilot lines 71 and 70, respectively, the valve member of the signal-setting valve shifts to the left from the position shown in FIG. 1. In this position, inlet connection 66 is blocked and inlet connection 67 delivers fluid from line 69 to outlet connections 78 and 79 as modulated across the outlet connection 74 to tank 75 to set a variable control signal, dependent upon the pressure differential. The variable control signal is delivered through outlet connection 79 to the pilot for the displacement control valve and is also delivered through outlet connection 78 and line 85 to the feedback pilot which acts in a direction tending to return the valve member of the displacement-setting valve to neutral centered position.

The signal-setting valve also operates when the motor 10 rotates in the opposite direction. In this instance, the pressure in line 68 is higher than in line 69 whereby the higher pressure in pilot line 70 shifts the valve member toward the right, as viewed in FIG. 1. In this position, inlet connection 67 is blocked and the pressure of fluid in line 68 is modulated to provide a variable control signal which is delivered from outlet connection 76 to the line 82 leading to the displacement control valve and also to outlet connection 77 leading to the pilot through feedback line 84.

In each of the aforesaid positions of the valve member away from the centered position, the feedback pilot that is not operative is open to tank 75.

The signal-setting valve 65 has multiple areas with metering lands whereby a ratio is achieved between the pressure drop in the closed circuit line and the variable control signal. The swash plate 50 can remain at its maximum motor displacement position until the variable control signal reaches a predetermined value since the signal acts against the spring 83 of the displacement control valve 56 and the flow delivered to the servo cylinder 55 has to overcome the force of the spring 58 in the servo cylinder.

Figure 2:
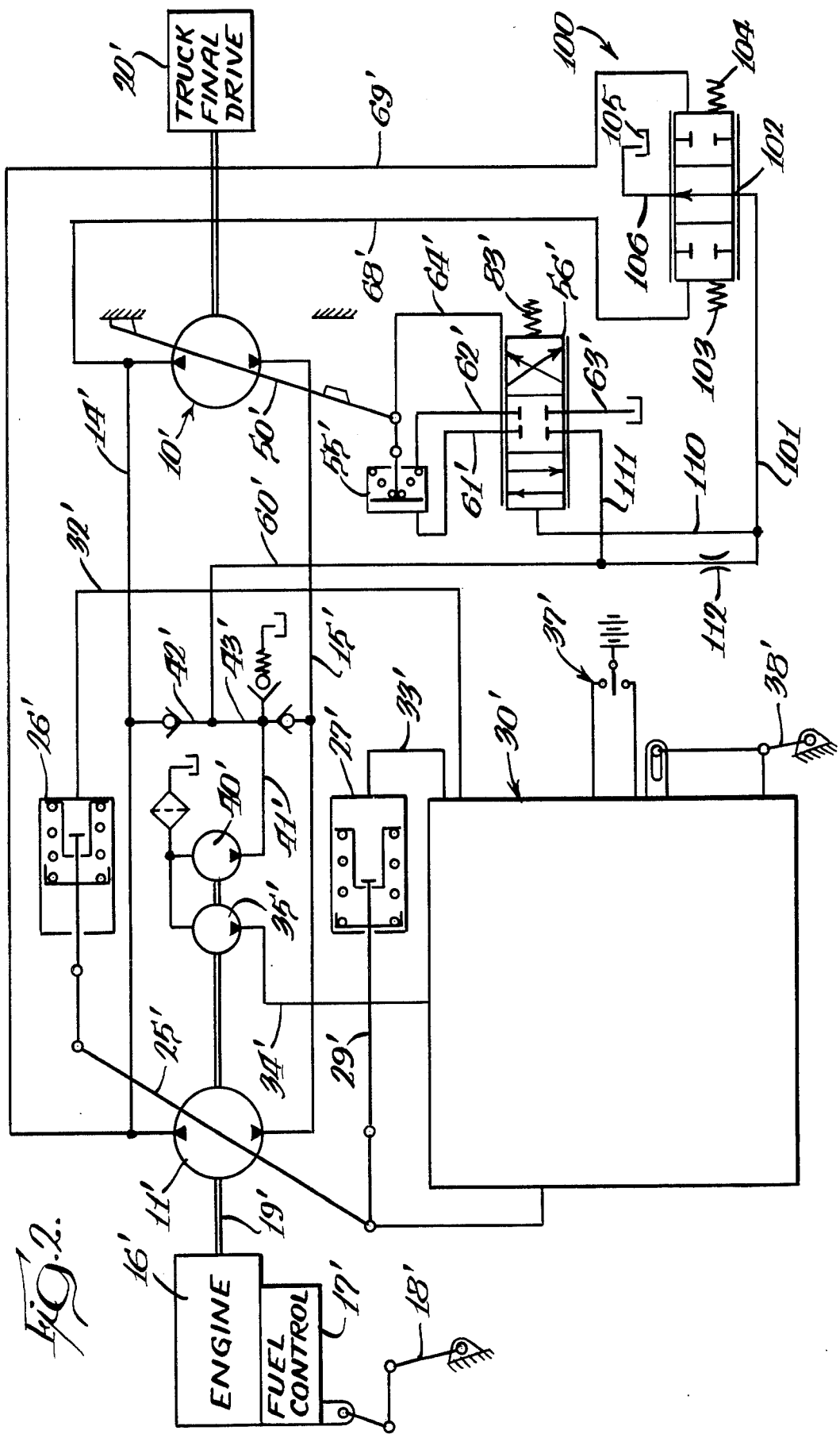
FIG. 2 is a schematic drawing similar to FIG. 1 showing a second embodiment of the control for the variable displacement motor.

In the embodiment of FIG. 2, the components of the hydrostatic transmission and the association thereof with components of the vehicle are the same as described in connection with FIG. 1 and the same reference numeral has been given to the same parts, with a prime affixed thereto. Additionally, the displacement control valve and servo cylinder for setting the displacement of the swash plate 50' are the same structure as shown in FIG. 1 and have similar reference numerals with primes affixed thereto.

The flow-sensing control of FIG. 2 for controlling displacement of the variable displacement motor 10' is similar to that shown in FIG. 1 wherein the lines 68' and 69', which connect into the closed system circuit line 14', are directed to pilot areas at opposite ends of a valve member of a signal-setting valve, indicated generally at 100, to position the valve member in response to the pressure drop in the circuit line. A source of fluid under pressure is directed to the signal-setting valve 100 from line 60' supplied by the charge pump 40' by a connecting line 101 which extends from the line 60' to an inlet connection 102 at the valve. The valve member of the signal-setting valve is normally centered by opposing springs 103 and 104 whereby fluid in line 101 communicates with tank 105 through a line 106.

The signal-setting valve 100 functions as a variable orifice whereby existence of a pressure differential applied thereto results in the valve member modulating flow to tank 105 with the resulting setting of a variable control signal proportional to the pressure drop in the circuit line 14'. This variable control signal exists in the line 101 extending to the valve and a branch line 110 extending therefrom delivers the variable control signal to the displacement control valve 56' to establish a position thereof in opposition to the spring 83'. In this embodiment, the fluid directed to the displacement control valve 56' for controlled delivery to the servo cylinder is directed thereto through a branch line 111 which connects into the supply line 60' from the charge pump. A pressure-immunizing orifice 112 is positioned between the branch line 111 and the control fluid line 110 delivering the variable control signal to the displacement control valve.

The signal-setting valve 100 can shift in either direction in response to a pressure differential and, thus, is operable in both directions of rotation of the motor 10'.

Figure 3:
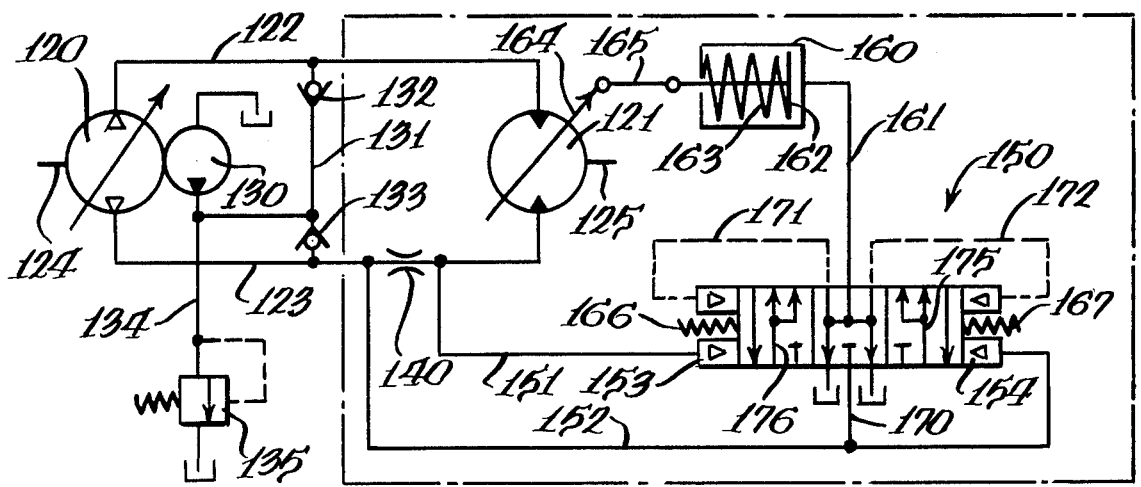
FIG. 3 is a schematic drawing showing a third embodiment of variable displacement motor control for a motor which is part of a hydrostatic transmission.
Figure 4:
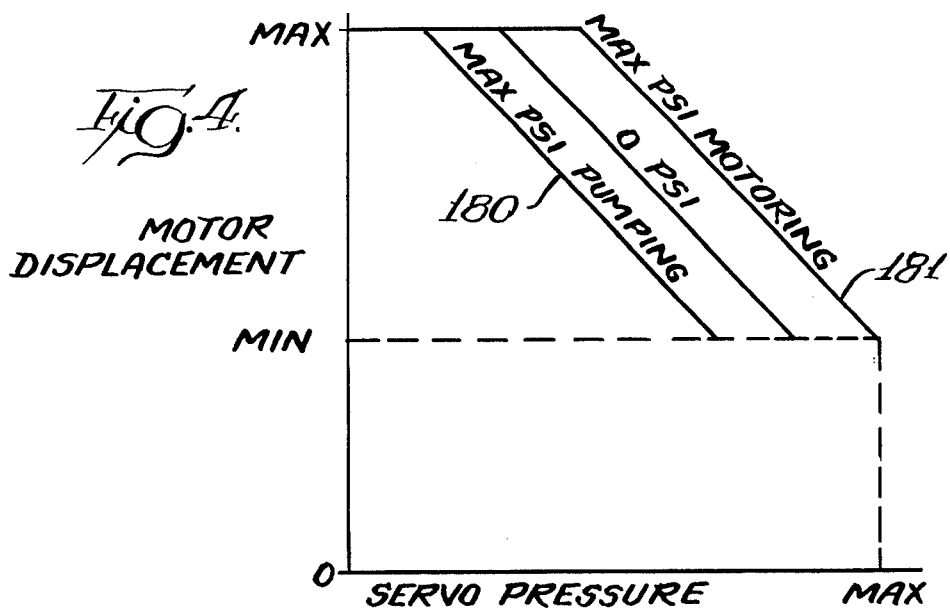
FIG. 4 is a graph plotting motor displacement against servo pressure; and showing motor displacement as affected by system pressure.

In the embodiment of FIG. 3, a hydrostatic transmission is shown wherein a closed loop circuit includes a variable displacement pump 120 and a variable displacement motor 121 interconnected to system circuit lines 122 and 123 and which is generally similar to the hydrostatic transmission shown in FIGS. 1 and 2. The hydrostatic transmission can be utilized in a vehicle propulsion system or other drive train wherein an input to the pump is through a drive shaft 124 and there is an output from the motor through a shaft 125. Make-up fluid to the closed circuit is supplied by a charge pump 130 which connects to a line 131 extending to opposite sides of the hydrostatic transmission closed circuit and having the check valves 132 and 133. A line 134 extends from the charge pump to tank and has an overpressure relief valve 135.

The rate of fluid flow through the motor is sensed by a pressure drop across an orifice 140 in the closed system circuit line 123. The pressure drop is sensed across a signal-setting valve 150 by the pressures at opposide side of the orifice 140 being delivered through lines 151 and 152 to pilots 153 and 154, respectively, at opposite ends of the valve 150.

The signal-setting valve 150 functions to deliver a variable control signal to a servo cylinder 160 through a line 161. The servo cylinder has a piston 162 which can move to position a swash plate 164 of the motor 121 through connecting mechanical structure 165. The variable control signal acts on the piston 162 in opposition to a spring 163 in the cylinder.

The signal-setting valve 150 has a valve member with a neutral center position, as established by opposing springs 166 and 167. Control fluid delivered from the closed system circuit line 123 through the pilot line 152 is directed to an inlet connection for the valve through a line 170. In the neutral center position, flow to the servo cylinder 160 is blocked and the servo cylinder and a pair of feedback pilot lines 171 and 172 are connected to tank. When flow to the motor 121 is through the closed circuit line 123, the higher pressure exists in pilot line 152 and as applied to pilot 154 overcomes the lower pressure at pilot 153 to shift the valve member to the left from the position shown in FIG. 3. In the shifted position, there is a modulating action to establish a variable control signal in valve passage 175 which is delivered to the servo cylinder 160 and also to the feedback line 171. The feedback line 172 is connected to tank.

When the flow to the motor 121 is through the line 122, the higher pressure exists in pilot line 151 whereby the valve member is shifted to the right from the position shown in FIG. 3 wherein the fluid pressure supplied to the valve is modulated and a variable control signal is delivered by the flow passage 176 of the valve member to the servo cylinder and also to the feedback line 172 to oppose the higher pilot pressure.

The signal-setting valve 150 operates to send a variable control signal to the motor displacement control which is in proportion to the flow through the motor, with the position of the piston of the servo cylinder being also dependent on the force of the spring 163 and swash plate moments within the motor 121. The servo cylinder acts to reduce motor displacement as motor flow increases above a pre-set value. Because of swash plate moments, motor displacement also reacts to the positive and negative pressures in the closed circuit.

At rest, motor flow is zero and the signal-setting valve 150 is centered. The servo cylinder 160 is drained through the signal-setting valve and the spring 163 holds the motor at maximum displacement. As pump flow increases, the pressure drop across the orifice 140 causes the signal-setting valve 150 to raise the value of the variable control signal in line 161. When flow through the motor reaches a certain value, the pressure drop across the orifice is sufficient to cause fluid supplied to the servo cylinder 162 to overcome the load of the servo spring 163 and the motor displacement reduces. Maximum pump flow is sufficient to cause the motor displacement to reduce to its minimum value.

The signal-setting valve 150 functions to produce a positive variable control signal of the same magnitude in either direction of pump flow and at either high or low system pressure.

FIG. 3 shows the effect of swash plate moments on the angle of the swash plate 164 at various values of servo pressure as established by the variable control signal. Pressure moments acting on the swash plate can be arranged to always produce forces which tend to reduce working pressure. When the motor 121 is functioning as a motor, this will increase displacement and, when the motor is functioning as a pump, as when the vehicle is going downhill and the hydrostatic transmission is functioning to brake the speed of movement of the vehicle, the displacement of the motor will decrease. The amount of force can also be varied, which will change the spacing between the maximum system pressure lines 180 and 181, which represent maximum system pressure when the motor is functioning as a pump, and when the motor is functioning as a motor, respectively. The slope of the lines 180 and 181 can be changed by changing the rate of the servo spring 163.

Figure 5:
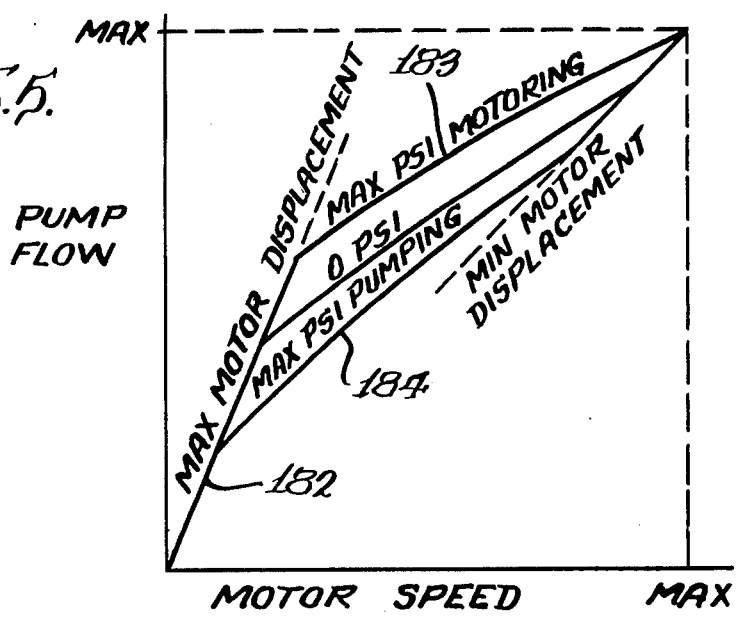
FIG. 5 is a graph plotting pump flow with respect to motor speed and showing motor displacement at various conditions including different system pressures.

A result of the motor displacement control is shown in FIG. 5. The motor always starts at maximum displacement, as represented by line 182, which provides minimum working pressure during high torque periods of operation. As pump flow increases, motor displacement decreases, increasing motor speed at an increasing rate. The motor speed is primarily dependent on the pump flow, allowing a selection of machine functions, such as vehicle speed with essentially only control of the pump. A limited amount of pressure compensation is available to automatically adjust output speed for load variations. As shown in FIG. 5, as pump flow increases, decreased motor displacement results in increased motor speed. A line 183 shows the decrease in displacement and increasing motor speed when the closed circuit system pressure is at a maximum and the motor 121 is functioning as a motor. The line 184 shows the decreasing motor displacement and increasing motor speed in response to increased flow through the motor, when the motor 121 is functioning as a pump.

INDUSTRIAL APPLICABILITY

With the controls, as disclosed herein, for a variable displacement motor, it is possible to have a motor initially set at maximum displacement and, thereafter, reduce motor displacement for increased motor speed as flow through the motor increases. With this control, the speed of a device, such as a vehicle, driven by the motor, may be controlled solely by control of the pump which supplies the fluid flow to the motor and with the controls automatically functioning to control motor displacement in either direction of fluid flow through the motor.

I claim:

1. A control for a variable displacement motor operable in either direction of rotation and having a movable member for setting motor displacement, positioning means including a servo member connected to said movable member for normally urging said movable member to a first position to set maximum motor displacement and for moving said movable member from said first position in response to a variable control signal, and means including a signal-setting valve operable in either direction of fluid flow through the motor and responsive to the rate of fluid flow therethrough for establishing said variable control signal generally proportional to said rate of fluid flow and which is applied to said member-positioning means.

2. A control as defined in claim 1 wherein said servo member comprises a servo cylinder having a spring to urge said movable member to said first position, said positioning means includes a displacement control valve for directing a control pressure to said servo cylinder in opposition to said spring, and said variable control signal being applied to said displacement control valve.

3. A control as defined in claim 2 wherein said motor is in a closed circuit with a pump, and said signal-setting valve has a pair of opposed pilot areas exposed to a pressure differential representative of said rate of fluid flow.

4. A control as defined in claim 3 wherein said closed circuit has a pair of fluid lines between the pump and motor; and said signal-setting valve has a pair of inlet connections communicating with one of said fluid lines, an outlet connection communicating with the displacement control valve, and a valve member positionable by said pressure differential to control communication between one of said inlet connections and said outlet connection to provide said variable control signal.

5. A control as defined in claim 3 including a source of control pressure extended to said signal-setting valve and to said displacement control valve, said signal-setting valve having an outlet connection to tank, and a valve member movable to define a variable orifice connection to tank and positionable responsive to said pressure differential whereby said control pressure is modified to establish said variable control signal.

6. A control as defined in claim 1 wherein said positioning means comprises a servo cylinder having a spring to urge said movable member to said first position, and said variable control signal being applied to said control servo in opposition to the force of said spring.

7. A control as defined in claim 6 wherein said signal-setting valve has a valve member having a closed centered position and movable in either direction therefrom in response to the pressure difference between a pair of opposed pilot areas, a pair of fluid lines extended one between each of the pilot areas and a fluid line connected to said motor for applying pressures to said pilot areas indicating a pressure drop in the motor fluid line representative of flow in the motor fluid line, said signal-setting line having an inlet connection to a source of control pressure and an outlet connection to said servo cylinder, and said valve member having means to modulate the control pressure to provide said variable control signal when moved from said closed centered position.

8. A control for a variable displacement motor operable in either direction of rotation and having a movable member for setting motor displacement, positioning means including a servo cylinder connected to said movable member for normally urging said movable member to a first position to set maximum motor displacement and for moving said movable member from said first position in response to a variable control signal above a predetermined value, and means including a signal-setting valve having means responsive to the rate of fluid flow through the motor in either direction of fluid flow therethrough for establishing said variable control signal generally proportional to said rate of fluid flow and which is applied to said member-positioning means.

9. A control as defined in claim 8 wherein said motor is in a closed circuit with a pump, and said signal-setting valve has a pair of opposed pilot areas exposed to a pressure differential representative of said rate of fluid flow.

10. A control as defined in claim 9 wherein said closed circuit has a pair of fluid lines between the pump and motor; said positioning means including a displacement control valve; and said signal-setting valve has a pair of inlet connections communicating with the displacement control valve, and a valve member positionable by said pressure differential to control communication between one of said inlet connections and said outlet connection to provide said variable control signal.

11. A control as defined in claim 9 wherein said positioning means includes a displacement control valve and including a source of control pressure extended to said signal-setting valve and to said displacement control valve, said signal-setting valve having an outlet connection to tank, and a valve member movable to define a variable orifice connection to tank and positionable responsive to said pressure differential whereby said control pressure is modified to establish said variable control signal.

12. A control as defined in claim 8 wherein said signal-setting valve has a valve member having a closed centered position and movable in either direction therefrom in response to the pressure difference between a pair of opposed pilot areas, a pair of fluid lines extended one between each of the pilot areas and a fluid line connected to said motor for applying pressures to said pilot areas indicating a pressure drop in the motor fluid line representative of flow in the motor fluid line, said signal-setting line having an inlet connection to a source of control pressure and an outlet connection to said servo cylinder, and said valve member having means to modulate the control pressure to provide said variable control signal when moved from said closed centered position.

13. A control for a variable displacement motor operable in either direction of rotation and having a movable member for setting motor displacement; means including a displacement control valve and a servo cylinder connected to said movable member for normally urging said movable member to a first position to set maximum motor displacement and for moving said movable member from said first position in response to a variable control signal; a signal-setting valve having a valve member with a center position and movable therefrom to establish a variable control signal directed to said displacement control valve, said signal-setting valve having pilot means responsive to a pressure differential representative of the rate of fluid flow through the motor for positioning of the valve member, a pair of inlet connections for delivery of control pressure thereto, an outlet connection to tank, a pair of outlet connections to the displacement control valve, a pair of feedback pilots, outlet connections extended one to each of said feedback pilots; and said signal-setting valve and valve member having means operable when positioned at either side of the center position for modifying the control pressure to set the variable control signal and for directing the variable control signal to one of said feedback pilots.

14. A control for a variable displacement motor operable in either direction of rotation and having a movable member for setting motor displacement; means including a servo cylinder connected to said movable member for normally urging said movable member to a first position to set maximum motor displacement and for moving said movable member from said first position in response to a variable control signal; a signal-setting valve having a valve member with a closed centered position and movable therefrom to establish a variable control signal directed to said servo cylinder, said signal-setting valve having pilot means responsive to a pressure differential representative of the rate of fluid flow through the motor for positioning of the valve member, an inlet connection for delivery of control pressure thereto, a pair of outlet connections to tank, an outlet connection to the servo cylinder, a pair of feedback pilots, outlet connections extended one to each of said feedback pilots; and said signal-setting valve and valve member having means operable when positioned at either side of the closed centered position for modifying the control pressure to set the variable control signal and for directing the variable control signal to one of said feedback pilots.

15. A control for a variable displacement motor operable in either direction of rotation and having a movable member for setting motor displacement; means including a displacement control valve and a servo cylinder connected to said movable member for normally urging said movable member to a first position to set maximum motor displacement and for moving said movable member from said first position in response to a variable control signal; a signal-setting valve having a valve member with a closed centered position and movable therefrom to establish a variable control signal directed to said displacement control valve, said signal-setting valve having pilot means responsive to a pressure differential representative of the rate of fluid flow through the motor for positioning of the valve member, an inlet connection for delivery of control pressure thereto, and an outlet connection to tank; said signal-setting valve and valve member having means operable when positioned at either side of the closed centered position for modifying the control pressure to set the variable control signal; and means responsive to the variable control signal for positioning said displacement control valve.

16. A control for a variable displacement motor having a movable member for setting motor displacement; means including a servo cylinder connected to said movable member for normally urging said movable member to a first position to set maximum motor displacement and for moving said movable member from said first position in response to a variable control signal; a signal-setting valve having a valve member movable from a first position to establish a variable control signal, said signal-setting valve having pilot means responsive to a pressure differential representative of the rate of fluid flow through the motor for positioning of the valve member, an inlet connection for delivery of control pressure thereto, an outlet connection to tank, an outlet connection for delivery of the variable control signal, a pair of feedback pilots, outlet connections extended one to each of said feedback pilots; and said signal-setting valve and valve member having means operable when positioned away from said first position from modifying the control pressure to set the variable control signal and for directing the variable control signal to one of said feedback pilots.

17. A control for a variable displacement motor having a movable member for setting motor displacement; means including a displacement control valve and a servo cylinder connected to said movable member for normally urging said movable member to a first position to set maximum motor displacement and for moving said movable member from said first position in response to a variable control signal; a signal-setting valve having a valve member with a closed centered position and movable therefrom to establish a variable control signal directed to said displacement control valve, said signal-setting valve having pilot means responsive to a pressure differential representative of the rate of fluid flow through the motor for positioning of the valve member; a supply fluid line for directing fluid under pressure to said signal-setting valve and having a branch line extending to said displacement control valve for supplying fluid for operation of the displacement control valve; said signal-setting valve and valve member having means operable when the valve member is shifted from; the closed centered position for modifying the pressure in the fluid line to set the variable control signal; a control fluid line extended from said supply fluid line to deliver the variable control signal to a pilot for positioning said displacement control valve; and a pressure-immunizing orifice in said supply fluid line between said branch line and the control fluid line.

* * * * *